United States Patent [19]

Herve

[11] Patent Number: 4,699,350

[45] Date of Patent: Oct. 13, 1987

[54] VALVE AND A PROCESS FOR REMOVING A CLOSURE MEMBER OF THE VALVE

[75] Inventor: Jean-Luc Herve, Noisy Le Roi, France

[73] Assignee: TOTAL Compagnie Francaise de Petroles, Paris, France

[21] Appl. No.: 841,413

[22] Filed: Mar. 19, 1986

[30] Foreign Application Priority Data

Apr. 4, 1985 [FR] France ................. 85 05130

[51] Int. Cl.⁴ .................................. F16K 3/02
[52] U.S. Cl. ..................... 251/1.3; 137/315; 92/151
[58] Field of Search ........... 251/1.3; 137/315; 92/51, 52, 151

[56] References Cited

U.S. PATENT DOCUMENTS

| | | | |
|---|---|---|---|
| 1,886,340 | 11/1932 | King | 251/1.3 |
| 3,302,535 | 2/1967 | Procter et al. | 92/52 |
| 3,590,920 | 7/1971 | Orund et al. | 251/1.3 |
| 3,918,478 | 11/1975 | LeRouax | 137/315 |
| 4,296,677 | 10/1981 | Little et al. | 92/151 |
| 4,457,212 | 7/1984 | Unger et al. | 92/52 |
| 4,526,339 | 7/1985 | Miller | 251/1.3 |

Primary Examiner—A. Michael Chambers
Assistant Examiner—John C. Fox
Attorney, Agent, or Firm—Sughrue, Mion, Zinn, Macpeak and Seas

[57] ABSTRACT

A valve, for example for use as a pipeline stop valve or a blow-out preventer, comprises a body with a central passage and opposed aligned guideways extending outwards from the passage. A closure member is provided in each guideway, each of which guideways is closed by a bonnet housing moving means for the respective closure member. The moving means are adapted to move each closure member through the central passage and into the opposite guideway, the closure members sealing therein to enable the opposite bonnet and associated closure member to be removed for a servicing operation.

3 Claims, 11 Drawing Figures

VALVE AND A PROCESS FOR REMOVING A CLOSURE MEMBER OF THE VALVE

The present invention relates to a valve which may, for example, form a stop valve for mounting on an underwater pipeline or a blow-out preventer (B.O.P.) of the jaw or ram type. It also relates to a process for removing or changing a closure member of such a valve.

In prior valves, to repair or remove the closure member it was necessary to put the system in which the valve was installed out of operation. This is particularly true as regards stop valves on underwater pipelines and blow-out preventers (B.O.P.) installed on a well head, where down time on the underwater pipelines or wells is very costly or unacceptable except in dire emergencies, and where the repair process entails a considerable loss of revenue or a high cost in terms of down time because of the closure of an underwater stop valve or a blow-out preventer (B.O.P.).

According to one aspect of the present invention there is provided a valve comprising a body having a central passage extending therethrough and opposed aligned guideways extending outward from said central passage, a closure member in each of said guideways, a bonnet removably fastened to said body over the outer opening of each of said guideways, sealing means carried by each of said closure member for sealing in said guideways and movable against each other to close said central passage, and moving means for moving said closure members in said guideways, said moving means of each of said closure members having a sufficient extension to move the respective said closure member across said central passage into the opposite said guideway, said sealing means providing a seal round said closure member against the walls of said opposite guideway.

According to another aspect of the invention there is provided a process for removing a closure member of a valve as described above which may be an underwater stop valve or a blow-out preventer, which process can be carried out without a loss of pressure in the central passage. The process comprises the stages of, after the closure members have been retracted, actuating the moving means of the closure member opposite that to be removed to bring it into sealing engagement in the guideway of the closure member to be removed, separating the bonnet of the closure member to be removed from the body of the valve and removing the closure member from the bonnet separated in this way. A process for changing a closure member comprises, after the removal of the closure member, the stages of installing a new or repaired closure member in the removed bonnet, refastening the bonnet to the valve body and retracting the other closure member, which is in an advanced position, into it bonnet.

When a valve as described above is used as a blow-out preventer, one closure member can be removed, while the valve is installed in a well head under pressure, without producing a leak.

When a valve as described above is used as a stop valve in an operational underwater pipeline, one of the closure members can be removed without putting the pipeline out of operation.

According to a further aspect of the invention there is provided a process for changing the shut-off members of a valve as described above comprising the following states: supplying pressurized fluid to the moving means of one of said closure members to move it through said central passage and to bring it into sealed engagement with said guideway of said other one of said closure members, separating said bonnet of said other closure member and said other closure member from said body of said valve, separating said other closure member from its said bonnet, fastening another closure member in the said bonnet, refastening the said bonnet to said body, retracting said first closure member into its said guideway, supplying pressurized fluid to the moving means of said other closure member to move it through said central passage and into sealed engagement with said guideway of said one closure member, separating said bonnet of said one closure member and said one closure member from said body of said valve, separating said one closure member from its bonnet, fastening another closure member in the said bonnet, refastening said bonnet to said body, and retracting said other closure member in its said guideway.

Embodiments according to the invention will now be described, by way of example only, with reference to the attached drawings.

Figure 1:
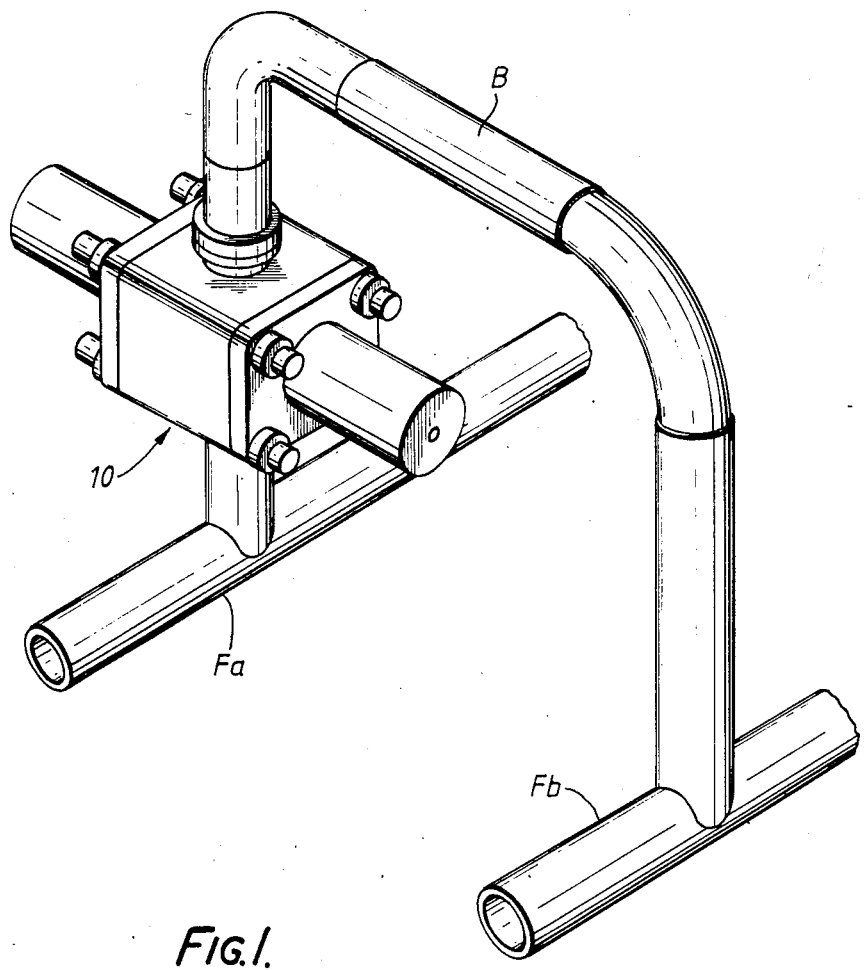
FIG. 1 is a perspective view of an embodiment of valve according to the invention installed as a stop valve on a bypass or feeder line between two underwater pipelines.
Figure 2:
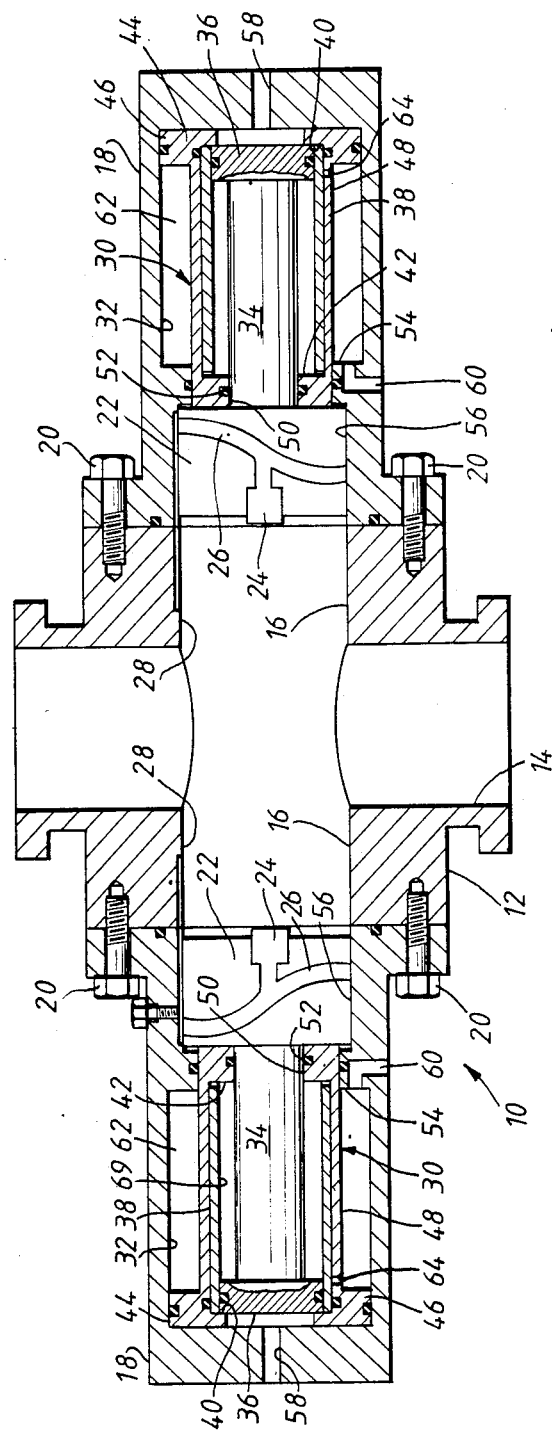
FIG. 2 is an axial section through the valve of FIG. 1, with the two closure members shown in their retracted position.
Figure 3:
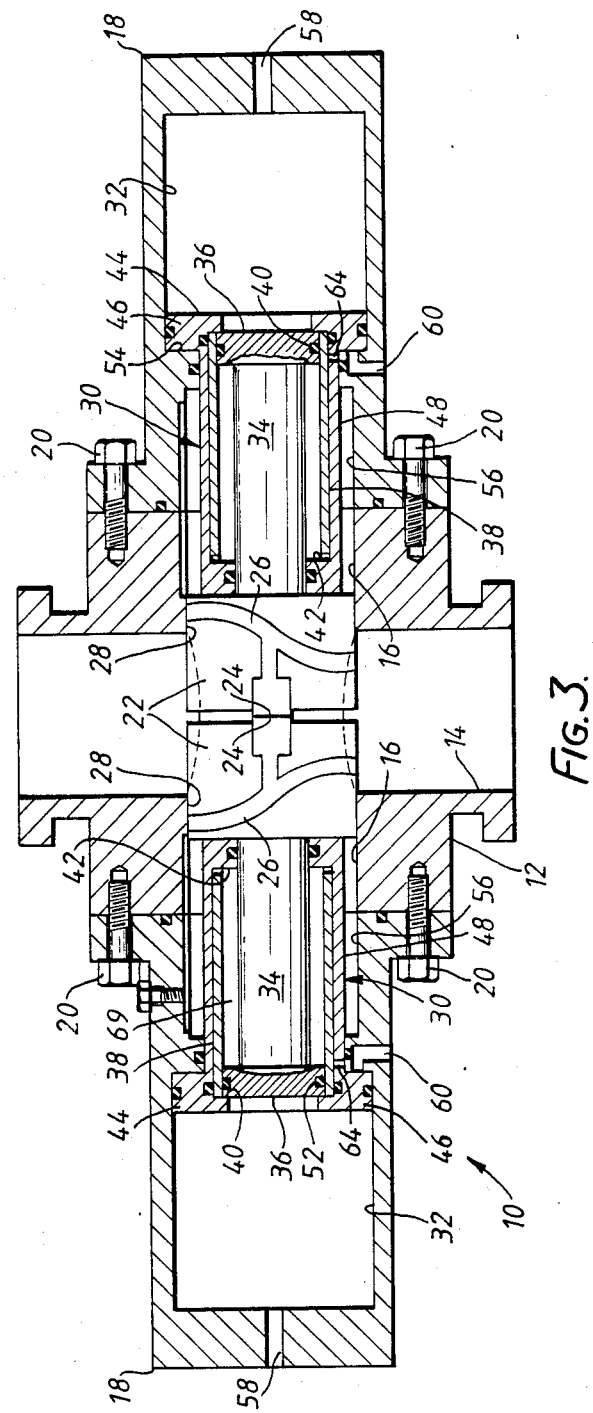
FIG. 3 is a section similar to that of FIG. 2, but with the closure members shown in their closing position.

FIG. 4 comprises a plurality of diagrammatic representations of the valve of FIGS. 1 to 3 in a sequence of relative positions illustrating an embodiment of the process according to the present invention. FIG. 4A shows the valve with the two closure members fully open. FIG. 4B shows the valve with the righthand closure member fully advanced so as to sealingly engage in a left-hand guideway. FIG. 4C shows the valve with the left-hand bonnet and its closure member separated from the valve body. FIG. 4D shows the valve with this closure member removed from its bonnet and with the connecting rod of the closure member projecting from the bonnet. FIG. 4E shows the valve with a new closure member fastened to the end of the connecting rod projecting from the removed bonnet. FIG. 4F shows the valve with the new closure member retracted into its bonnet. FIG. 4G shows the valve with the left-hand bonnet fastened to the valve body again. FIG. 4H shows the valve with the two closure members in their fully retracted position.

As can be seen in FIG. 1, the valve 10 is installed on a bypass B between underwater pipelines Fa and Fb. The valve 10 is thus shown as an underwater stop valve but it may also be used as a blow-out preventer in a well head to control the well pressures.

This valve 10 is shown in detail in FIG. 2, and comprises a body 12 having a central passage 14 passing through it axially, with opposing aligned guideways 16 extending transversely outwards from the central passage 14. Bonnets 18 are fastened to the body 12 in any suitable way at the outer openings of the guideways 16, for example by means of bolts 20 or simialar fastening means. Closure members or jaws 22, provided with suitable face sealing means 24 and lateral sealing means 26, e.g. gaskets, for sealing against the guideways 16, are arranged in guideways 16, as illustrated. It will be noted that the openings of the guideways 16 opening into the central passage are provided with lips 28, against which the lateral gaskets 26 sealingly engage when the closure members 22 are in the closing position, as will be described.

Moving means 30 for moving the closure members 22 are provided for each of the members 22. Each moving means is arranged in a counterbore 32 in the respective bonnet 18. A connectng rod 34 connects the respective closure member 22 to a piston 36 which can slide in a sealed manner in a tubular member 38. The tubular member 38 is located between inner shoulders 40 and 42 of a primary piston 44. The primary piston 44 comprises an outer flange 46 which projects radially outwards and which can slide in a sealed manner in the counterbore 32, a tubular member 48 and an inner flange 50 which forms the shoulder 42 and which is in contact with the outer end of its closure member 22 in the fully retracted position of the closure member. The inner bore of the flange 50 is in sealing contact with the outside of the connecting rod 34 by means of an O-ring seal 52. The counterbore 32 ends in a flange 54 which extends radially inwardly and which separates the counterbore 32 from bore 56 forming an extension of the respective guideway 16 of the body 12. Port 58 in the outer portion of the bonnet 18 makes communication with a suitable source of pressurized fluid to bring the corresponding closure member 22 into its closing position. Port 60 in the bonnet 18 passes through the flange 54 and enters the annular chamber 62 formed between the counterbore 32, the tubular member 48, the piston 44 and the flange 54. A port 64 is provided in the tubular member 48 adjacent the flange 46, and the tubular member 38 is not in sealing contact with the primary piston 44 at its inner end. This provides a passage for transmitting fluid under pressure, as will be explained later.

Figure 4A:
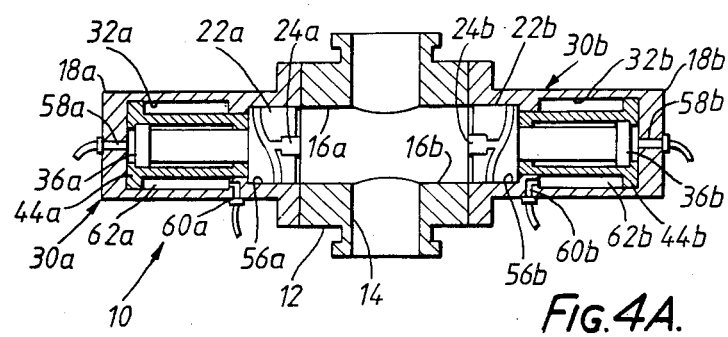

In the position shown in FIG. 2 and FIG. 4A, the closure members 22 are fully retracted and are located in the bores 56, so that there is no possible interference with the objects or materials moving through the central passage 14. This is especially important when the valve is used as an underwater stop valve or as a blowout preventer.

The closure members 22 are moved towards their closing position by applying pressurized fluid to the ports 58. The pressure of the fluid is exerted on the outer ends of the primary pistons 44, so that the moving means 30 as a whole are moved inwardly, until the members 22 meet and form a seal across the central passage 14 and between the faces of each of the closure members 22 and the interiors of the guideways 16, as shown in FIG. 3. In this position, the central passage 14 is completely closed, thus stopping flow fluids through passage 14. The closure members 22 are returned to their retracted positions by supplying the ports 60 with pressurized fluid, so that the pressure of the fluid is exerted on the inner face of the flange 46 and of the piston 36, to bring the moving means 30 as a whole into their outer position in the counterbores 32 of the bonnets 18.

When one of the closure members 22 or one of the moving means 30 is to be serviced or replaced, the moving means 30 associated with the opposite closure members 22 is actuated by supplying its port 58 with pressurized fluid, but without supplying the other port 58. The pressurized fluid forces the primary piston 44 and the piston 36 inwardly. When the primary piston 44 reaches the inner limit of its movement, the member 22 continues to be moved inwardly under the action of the piston 36 and penetrates the opposite guideway 16 to assume the position shown in FIG. 4B. In this position, the lateral sealing means 26 of the closure member 22 sealingly engages the interior of the guideway 16 and its lip 28 and, so that there is no possibility of leakage of fluid beyond the member 22. It is then possible to extract the bolts 20, remove the bonnet 18 and carry out work on the bonnet thus isolated, its moving means 30 or its closure member 22.

When the botton 18 and/or its associated means 30 or member 22 has been repaired or replaced, pressurized fluid is supplied to the port 60 of the moving means 30, which have previously been put into the advanced position. This introduces pressure into the annular chamber 62 and brings the primary piston 44 into the retracted position. The pressurized fluid also flows into the ports 64 and, passing round the inner end of the tubular member 38, into the annular space 69 between the connecting rod 34 and the interior of the tubular piece 38, to bring the piston 36 completely into its retracted position. This returns the component parts into the position shown in FIG. 4C. The bonnet 18, with its member 22 attached to the connecting rod 34, is then fastened to the body 12 again by means of the bolts 20 and comes up sealingly against the outer end of its guideway 16. This brings the component parts of this bonnet back into the position shown in FIG. 2.

The stages of an embodiment of process according to the present invention are illustrated more clearly in the series of drawings in FIG. 4, where the component parts located on the left are identified by the letter "a" and those located on the right are identified by the letter "b". FIG. 4A shows the valve 10 with its closure members 22 completely retracted into their respective bonnets 18. In this position, the flow through the central passage 14 is not impeded.

Figure 4B:
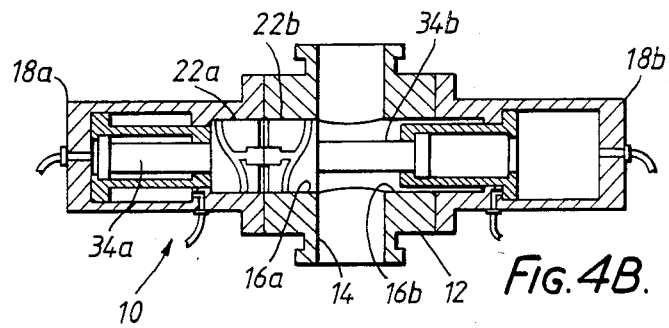
Figure 4C:
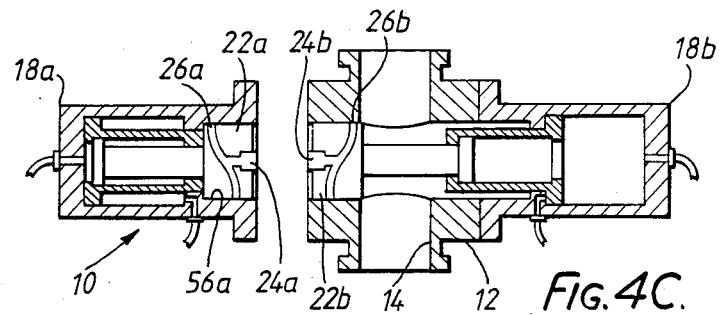
Figure 4D:
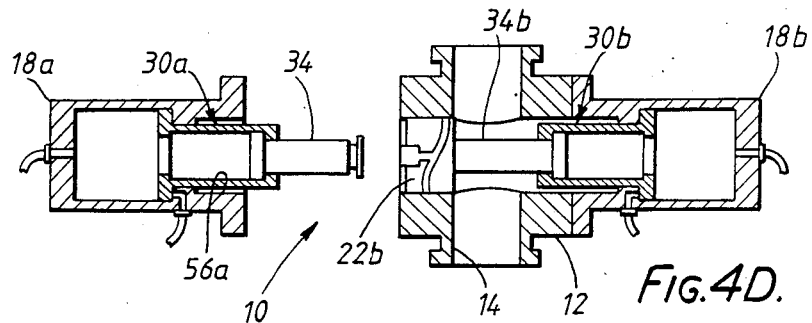

In FIG. 4B, the closure member 22b located on the right has been moved so as to come into sealed engagement in the left-hand guideway 16a, whilst the closure member 22a located on the left is fully retracted into its bonnet 18a. In this position, since the guideway 16a is isolated in a sealed manner from the central passage 14 by the right-hand closure member 22b, the left-hand bonnet 18a can be removed, as shown in FIG. 4C. This removal can be carried out manually or by remote control if remote-controlled connectors are used instead of the bolts 20. Once the bonnet 18a has been removed, the left-hand moving means 30a are put into operation to advance the closure member 22a and bring it into a position outside the bore 56a of its bonnet 18a. FIG. 4D shows, after the removal of the closure member 22a, the advanced position then assumed by the connecting rod 34a. When the operation is carried out by remote control, means are also provided for recovering the bonnet 18a separated from the body 12, so that e.g. its closure member 22a can be reconditioned, for example by removing and replacing the sealing means 24a and 26a, or replaced by a new closure member 22a.

Figure 4E:
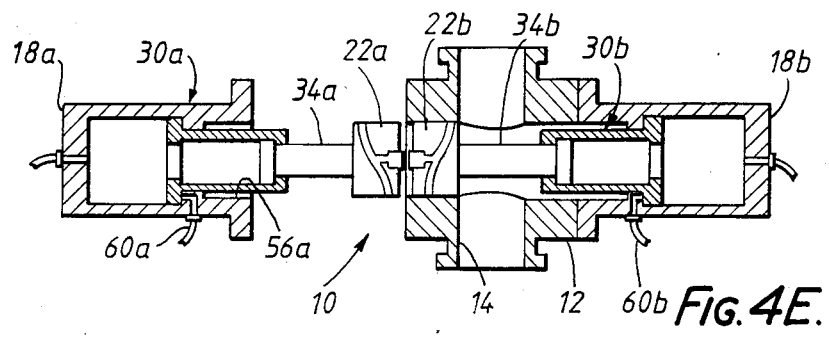
Figure 4F:
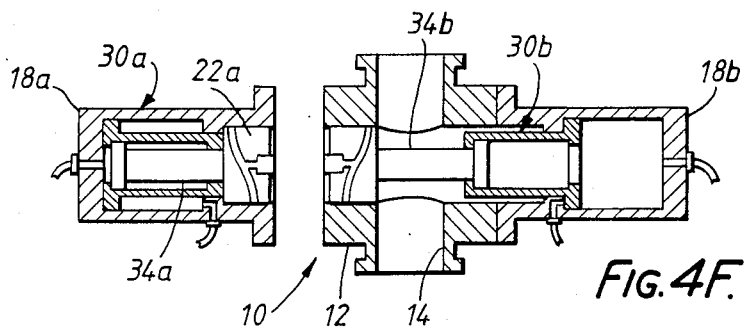
Figure 4G:
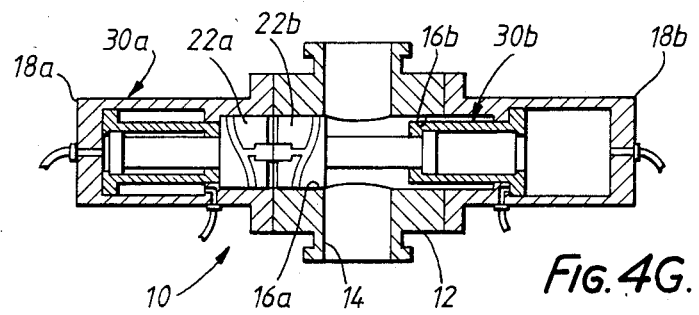
Figure 4H:
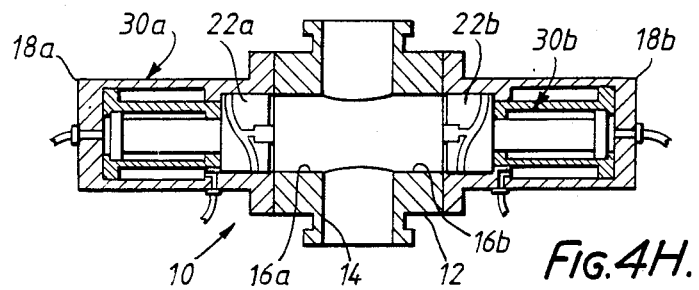

FIGS. 4E to 4H show the successive stages which complete the operation to change the closure member 22a. FIG. 4E illustrates the installation of a new or repaired closure member 22a on the end of the connecting rod 34a. When this closure member 22a is fastened firmly to the end of the connecting rod 34a, the moving means 30a are supplied with suitable hydraulic fluid via the port 60a, to retract the closure member 22a completely into the bonnet 18a, as shown in FIG. 4F. Subsequently, the bonnet 18a is fastened to the body 12 again either manually or by remote control, depending on the system used, as shown in FIG. 4G. Once the bonnet 18a has been fastened to the body 12 in a sealed manner, the right-hand closure member 22b is retracted into its bonnet 18b to bring it into the position shown in FIG. 4H.

It will be noted that, during the removal and replacement of one of the closure members 22 using the above described process, the flow through the valve 10 is not closed, but is only slightly restricted because of the advance of the connecting rod 34 in the central passage 14. Thus, repairs or replacements can be carried out in valves with opposed closure members, without having to isolate the valve to prevent a leakage of pressurized fluids from the line in which the valve is installed.

What is claimed is:

1. A valve comprising a body having a central passage extending therethrough and opposed aligned guideways extending outwardly from said central passage, a closure member in each of said guideways, a bonnet removably fastened to said body over an outer opening of each of said guideways, said outer opening being positioned in a direction opposite said central passage, sealing means carried by each of said closure members, wherein said closure members are movable to respective first positions away from each other for sealing in said guideways and movable against each other to a second position to close said central passage, and moving said closure members in said guideways, said sealing means of each of said closure members being movable to said second position to seal in the respective guideway when said closure members, in a closing position of said valve, are engaged with each other in said central passage, said moving means of each of said closure members having a sufficient extension to move a respective one of said closure members across said central passage to a third position entirely within the opposite guideway, said sealing means of each said closure members being movable to said third position to seal in the opposite guideway for removal of the associated said closure member and its said bonnet, said sealing means further providing a seal around the respective walls of said closure member against the walls of said opposite guideway when said closure member is in said third position, said closure members being so configured that positioning of one of said closure members in said third position leaves said central passage open.

2. A valve according to claim 1, wherein each said moving means comprises a telescopic piston for moving a respective one of said closure members.

3. A valve according to claim 1, wherein said moving means of said closure members are actuated independently of each other.

* * * * *